July 9, 1963  V. F. LUKE  3,097,286
SOLDER FEEDING SOLDERING GUN
Filed Aug. 22, 1961  2 Sheets-Sheet 1
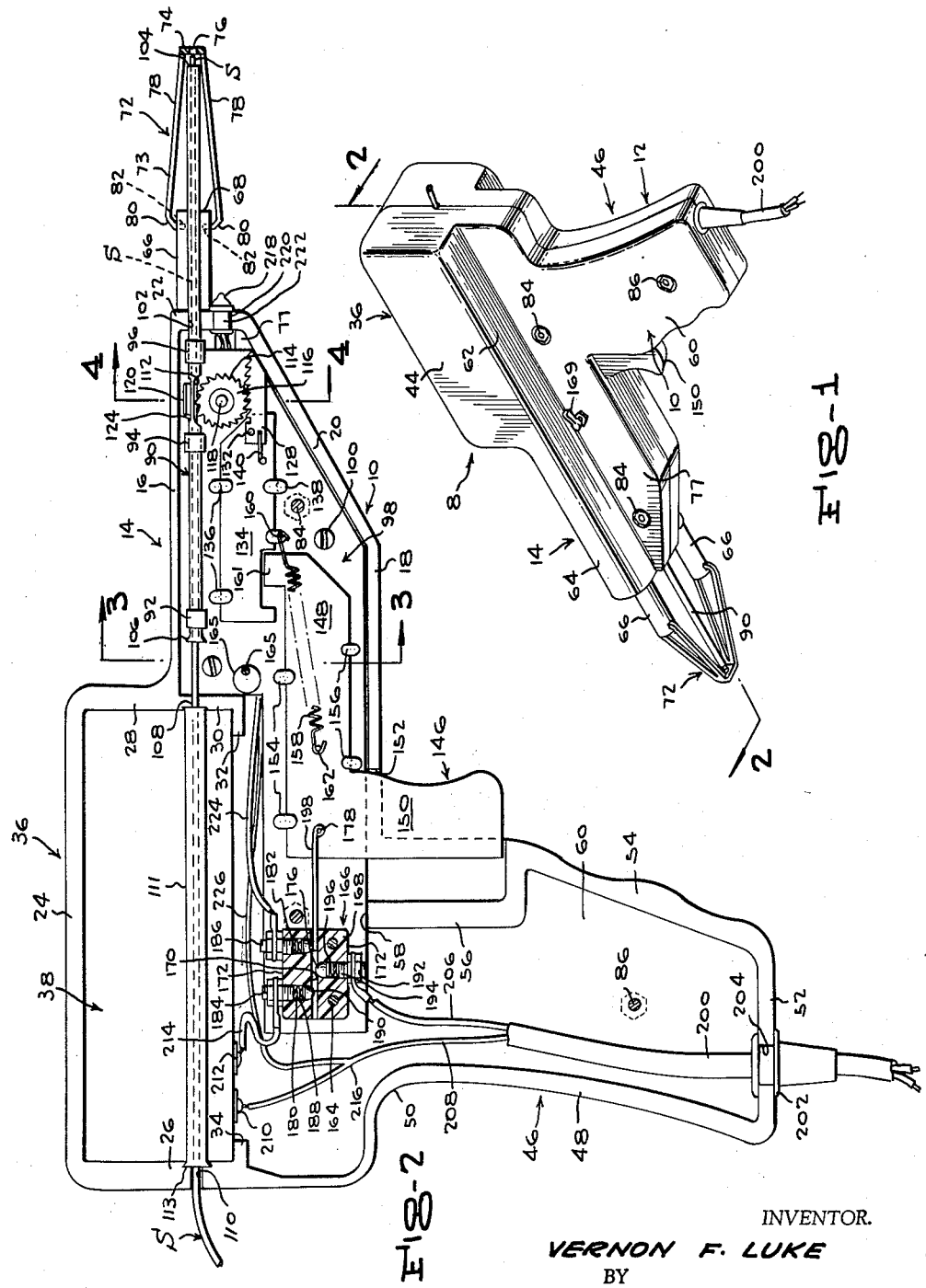
INVENTOR.
VERNON F. LUKE
BY
McMorrow, Berman & Davidson
ATTORNEYS

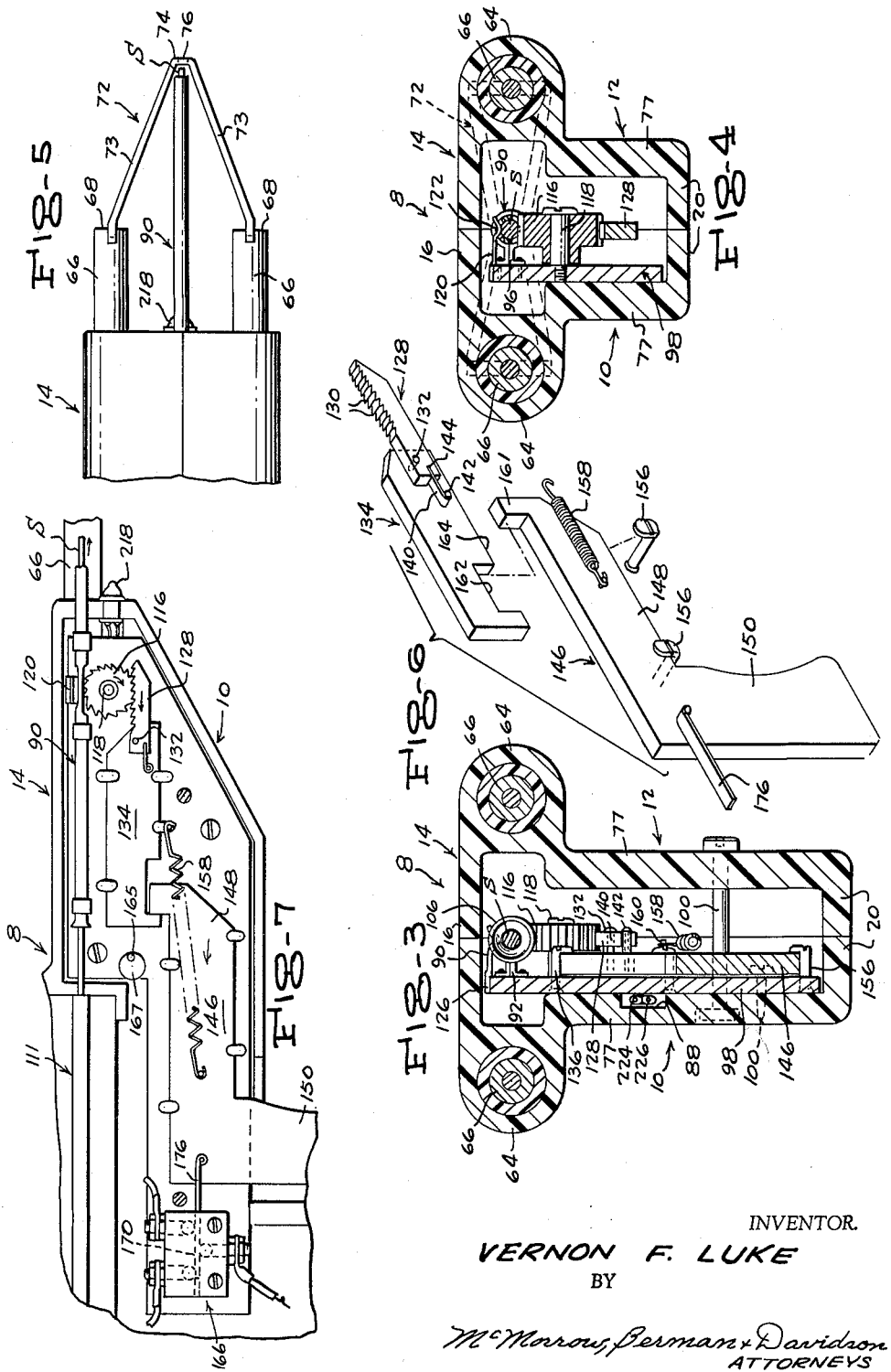

3,097,286
SOLDER FEEDING SOLDERING GUN
Vernon F. Luke, 1352 E. 5935 South,
Salt Lake City, Utah
Filed Aug. 22, 1961, Ser. No. 133,080
6 Claims. (Cl. 219—27)

This invention relates to a novel electrical soldering gun having solder-feeding means which is operated by the same means which operates a switch for electrically heating its soldering tip in advance of feeding the solder to the tip.

The primary object of the invention is the provision of an efficient, easily used, compact, and time and labor-saving soldering gun of the kind indicated, which eliminates manual feeding of solder to the tip of a soldering gun with one hand while manipulating the gun with the other hand.

Another object of the invention is the provision of a soldering gun of the character indicated above, which has novel wire solder feeding mechanism, and a wire solder feeding tube which is interchangeable with other feeding tubes of different diameters, for accommodating wire solder of different diameters, and means for predetermining the length of wire solder fed on each operation of the solder feeding mechanism.

A further object of the invention is the provision of a soldering gun of the character indicated above, which has a novel soldering tip through which wire solder is fed from the feeding tube.

Other important objects and advantageous features of the invention will be apparent from the following description and the accompanying drawings, wherein, for purposes of illustration only, a specific form of the invention is set forth in detail.

In the drawings:

FIGURE 1 is a rear perspective view of a soldering gun of the present invention;

FIGURE 2 is an enlarged vertical longitudinal section taken on the line 2—2 of FIGURE 1, showing the trigger operated mechanism in inoperative or starting position;

FIGURES 3 and 4 are further enlarged vertical transverse sections taken on the lines 3—3 and 4—4, respectively, of FIGURE 2;

FIGURE 5 is a fragmentary top plan view of the soldering tip of the gun;

FIGURE 6 is an exploded perspective view of the trigger operated mechanism; and, FIGURE 7 is a fragmentary side elevation of the soldering gun, with a section of its casing removed, and showing the mechanism in final operated position.

Referring in detail to the drawings, wherein like numerals designate like parts throughout the several views, the illustrated soldering gun comprises an automatic pistol-shaped hollow casing 8 which is vertically and longitudinally divided into two substantially similar, separable sections 10 and 12. The casing has a horizontally elongated barrel portion 14 which includes a top wall 16, a horizontal bottom wall 18, which has a forwardly inclined forward portion 20, and a vertical forward end wall 22 which extends between and is connected to the top and bottom walls. The top wall 16 has, at its rear end, an upwardly offset horizontal portion 24 which has a depending vertical rear end wall 26, and a depending forward end wall 28, which is joined to the rear end of the top wall 16, and has a downward extension 30, provided, at its lower end, with a rearwardly projecting transverse flange 34, on the rear end wall 26. The flanges 32 and 34 serve to support in the housing 36 defined by the walls 24, 26, and 28, an electrical transformer 38. As shown in FIGURE 1, the transformer housing 36 is of flat rectangular cross section, and has longitudinal side walls 44.

The casing 8 further comprises a vertical pistol grip portion 46, which is substantially narrower than and is centered relative to the transformer housing 36 and extends downwardly from the rear end wall 26 of the transformer housing 36. The upper part of the rear wall 48 is forwardly indented, as indicated at 50, and merges into a concavely curved lower portion which, at its lower end, merges into the rear end of a horizontal bottom wall 52. The bottom wall 52 merges, at its forward end, into the lower end of a vertical front wall which is composed of a forwardly inclined lower portion 54, which, at its upper end is connected to a rearwardly offset upper portion 56. The upper portion 56 terminates, at its upper end, 58, in downwardly spaced relation to the transformer housing 36. Side walls 60 extend between the bottom wall 52, the rear wall 48 and the portions 54 and 56 of the pistol grip front wall, and, as shown in FIGURE 1, merge, at their upper ends, into the transformer housing 36.

The transformer housing 36 side walls 14 and its bottom wall 62 have half-cylindrical longitudinal extensions 64 which reach forwardly from the transformer housing and which contains axially and longitudinally extending conductors 66. As shown in FIGURES 1 and 5, the conductors 66 extend forwardly beyond the extensions 64 and are in parallel relationship and have terminal forward ends 68, and are components of a novel soldering tip 72.

The soldering tip 72 is V-shaped and is composed of two forwardly converging arms 73 which are joined together, at their forward ends, by a short flat cross bar 74 which is provided with a central hole 76 therethrough. The arms 73 are composed of pairs of forwardly converging wires on bars 78, disposed in vertical planes, which are joined, at their forward ends to the upper and lower edges of the transverse bar 74. At their rear ends the wires 78 have inwardly directed terminals 80 which are securably engaged in diametrically opposed holes 82, provided in the conductors 66, near their forwards ends 68.

The casing sections 10 and 12 are assembled together in registered relationship, to constitute the casing 8, by means of longitudinally spaced bolts 84, extending through the side walls 77 of the barrel portion 14 of the gun, and by a bolt 86 extending through the side walls 60 of the pistol grip portion 46. The sections 10 and 12 differ from each other significantly only in the fact that wire solder feeding mechanism and the switch assembly are mounted entirely on the section 10, and the side wall of the section 10 is provided with an internal wire accommodating groove 88.

The wire solder feeding mechanism comprises a longitudinally elongated feeding tube 90 which is slidably and removably engaged through longitudinally spaced sleeve brackets 92, 94, and 96 which are, as shown in FIGURES 3 and 4, mounted on the inner side of mounting panel 98, which is fixed to the casing side wall, as by means of screws 100. The feeding tube 90 extends forwardly through the forward end wall 22 of the casing, through a hole 102 provided therein, and in line with the hole 76 in the cross bar 74 of the soldering tip 72. The tube 90 has a forward end 104 which is closely spaced from the cross bar 74, and has a flared rear end 106 which is located close to the forward end of the transformer housing 36. Wire solder S is guided into the rear end of the feeding tube 90, as by passing through a hole 110 in the rear wall 26 of the housing 36, into a main guide tube 111, and through a hole 108 in the forward housing end wall 28. The main guide tube 111 is fixed, at its rear end, as indicated at 113, to the rear end wall 28 of the housing 36, and at its forward end abuts and is secured to the front end wall 28.

The sleeve brackets 94 and 96 are located intermediate the ends of the feeding tube 90, at the forward end of the casing barrel portion 14, and are relatively closely spaced from each other. At a location midway between the sleeve brackets 94 and 96, the bottom wall end portions of the sides of the feeding tube 90 are cut away, as indicated at 112, so as to expose the wire solder S present at this point within the tube 90, to be engaged by the teeth 114 of a ratchet wheel 116. The ratchet wheel 116 is rotatably supported on the panel 98, as by means of a headed screw 118. Bearing upon the top of the feeding tube 90 over the cut-out 112 is a spring pressure arm 120 which has a downward projection 122 which bears upon the wire solder S, through a slot 124, provided in the top of the tube 90. The pressure arm 120 is fixed to the upper edge of the panel 98, as indicated at 126, in FIGURE 3, and serves the dual purpose of preventing rotation and longitudinal shifting of the feeding tube 90 in the sleeve brackets, and of pressing the solder S down upon the ratchet wheel 116.

For rotating the ratchet wheel 116, in a clockwise direction in FIGURE 2, for feeding the solder S forwardly in the tube 90 toward the cross bar 74 of the soldering tip 72, a ratchet bar 128 is provided, which has ratchet teeth 130 along its upper edge to engage the teeth 114 of the ratchet wheel 116. The ratchet bar 128 is pivoted, as indicated at 132, at its rear end, on the inward side of a longitudinally elongated slide plate 134 which extends rearwardly from the ratchet bar 128, and is confined, for endwise sliding movement, relative to the panel 98, by reclining L-shaped brackets which are fixed to the panel, and include longitudinally spaced upper brackets 136 which are engaged over the upper edge of the slide plate 134, and a lower bracket 138 which is engaged around the lower edge of the slide plate. As shown in detail in FIGURE 6, a leaf spring 140 has its rear end secured on a lateral pin 142 on the slide plate 134, behind the ratchet bar 128 and has its forward end engaged in a slot 144 in the rear end of the ratchet bar, for yieldably maintaining the ratchet bar engaged with the ratchet wheel.

Positioned behind and below the slide plate 134 is a reclining L-shaped trigger plate 146, which has a flat horizontal portion 148 bearing against and slidably supported on the panel 98, and a vertical portion 150 which extends downwardly through a slot 152 provided in the bottom wall 18 of the gun barrel portion 14, and works in the recess provided by the upper portion 56 of the front wall of the pistol grip portion 46. Longitudinally spaced upper and lower reclining L-shaped brackets 154 and 156, fixed to the panel 98, engage around the upper and lower edges, respectively, of the horizontal portions 148 of the trigger plate 146. A contractile coil spring 158 is stretched between and is connected at its ends, as indicated at 160 and 162, to the slide plate 134 and the trigger plate 146.

The horizontal portion 148 of the trigger plate 146 has, at its forward end, an upstanding lug 161 which is engaged in a notch 162 provided in the lower edge 164 of the slide plate 134, at the rear end thereof. The notch 162 is substantially longer than the lug 160 in order to provide lost motion between the trigger plate 146 and the slide plate 134 for a purpose hereinafter explained.

For adjusting the length of wire solder S which is fed on each stroke of the feeding mechanism, an eccentric stop pin 165 is provided, for engagement with the rear end of the slide plate 134, on rearward movement thereof. The stop pin 165 is on the laterally inward end of a cylinder 167 which is securably journalled through the side wall 77 of the section 10, and has an adjusting handle 169, which, as shown in FIGURE 1, is exposed outside of the casing 8.

Fixed to the inward side of the panel 98, as indicated at 164, behind and substantially on a level with the horizontal portion 148 of the trigger plate 146, is a switch assembly 166, which comprises a dielectric block 168, having a longitudinal slot 170 extending therethrough and spaced from the upper and lower ends 172 and 174, respectively, of the block. A flat longitudinally elongated contactor arm 176 is secured, as indicated at 178, at its forward end, to the inner side of the trigger plate portion 148, at the rear end thereof, and is slidably engaged through the slot 170. A pair of longitudinally spaced vertical bores 180 and 182, in the top of the block 168 accommodate binding posts 184 and 186, respectively, which are on electrical engagement with springs 188 located in the bores and bearing against ball contacts 190 therein, for contact with the contractor arm 176 in the slot 170. A single vertical bore 192, in the bottom of the block 168, located between the bores 180 and 182, accommodates another binding post 194 which is in electrical engagement with a spring 196, in the bore 192, which bears against a ball contact 198 for contact with the contactor arm 176 at the slot 170.

An appliance cord 200 leads into the pistol grip portion 46 of the casing 8, through a grommet 202 secured in a hole 204 in the bottom wall 52 thereof. The cord 200 contains wires 206 and 208, which are severally connected to the binding post 194, and one terminal 210 of the transformer 38. The other transformer terminal 212 is connected by a wire 214 to the rear binding post 184.

A soldering tip illuming bulb 218 is engaged in a socket 220 secured in an opening 222 in the forward end wall 22 of the casing 8, beneath the soldering tip 72, and wires 224 and 226 lead rearwardly therefrom through the groove 88 in the side wall of the casing section 10 and are severally connected to the wire 208, as indicated at 216, and to the forward binding post 186, so that the bulb 218 is illuminated before the soldering tip 72 is energized.

In operation, the gun being gripped by the pistol grip portion 46, the vertical trigger plate portion 150 is pulled rearwardly, and initially only far enough to light the bulb 218 and a slight additional pull heats the soldering tip 72, that is, far enough to put the contactor arm 176 in engagement with the ball contact 198 and the forward 190 contact ball, then farther back to engage the rear contact ball 190 of the switch assembly 166. Then, when the work to be soldered has sufficiently been heated by the engagement of the tip 72 therewith, the trigger plate portion 150 is pulled all the way back, so that the lost motion between the trigger plate lug 160 and the slide plate notch 162 is taken up and the lug 160 engages the rear end of the notch 162 and pulls the slide plate 134 far enough, in a rearward direction, to cause the ratchet bar 128 to rotate the ratchet wheel 116, and feed wire solder S out of the forward end of the feeding tube 90 to the cross bar 74 of the tip 72. If more solder is required at the time, or at a later time, the trigger plate portion 150 is released, so that the spring 158 pulls the trigger plate 146 forwardly with sufficient momentum to cause the lug 160 to strike against the forward end of the slide plate notch 162 and push the slide plate 134 and ratchet the ratchet bar 128 forwardly in contact with the ratchet wheel 116, to its forward starting position. Full retraction of the trigger plate portion 150 will then feed additional solder S to the cross bar 74 of the tip 72, while re-energizing the tip 72.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A solder feeding soldering gun comprising a support having forward and rear ends, a soldering tip on and extending forwardly from said forward end, wire solder feeding mechanism comprising a wire solder feeding tube having a forward end adjacent to said soldering tip and an open rear end, a ratchet wheel journalled on said support and having teeth to engage wire solder within the feeding tube, a ratchet bar having teeth engaged with the teeth of the ratchet wheel, and means for actuating the ratchet bar for feeding wire solder forwardly in the feeding tube to the soldering tip, said feeding tube having opening means through which the ratchet wheel engages the solder, an electrical switch assembly mounted on said support and electrically connected to the soldering tip, said actuating means comprising a trigger member mounted for endwise movements on the support, and lost motion means connecting the trigger member to the ratchet bar, and spring means yieldably urging said trigger member toward its starting position and toward said ratchet bar for moving the ratchet bar to a starting position from an operated position.

2. A solder feeding soldering gun comprising a support having forward and rear ends, a soldering tip on and extending forwardly from said forward end, wire solder feeding mechanism comprising a wire solder feeding tube having a forward end adjacent to said soldering tip and an open rear end, a ratchet wheel journalled on said support and having teeth to engage wire solder within the feeding tube, a ratchet bar having teeth engaged with the teeth of the ratchet wheel, and means for actuating the ratchet bar for feeding wire solder forwardly in the feeding tube to the soldering tip, said feeding tube having opening means through which the ratchet wheel engages the solder, an electrical switch assembly mounted on said support and electrically connected to the soldering tip, said actuating means comprising a trigger member mounted for endwise movements on the support, and lost motion means connecting the trigger member to the ratchet bar, and spring means yieldably urging said trigger member toward its starting position and toward said ratchet bar for moving the ratchet bar to a starting position from an operated position, said lost motion means comprising said trigger member and a slide plate mounted on said support, said ratchet bar being pivoted on said slide plate and spring-pressed toward the ratchet wheel, said slide plate having an elongated notch and said trigger member having a lug engaged in said notch, said lug being shorter than the notch.

3. A solder feeding soldering gun comprising a support having forward and rear ends, a soldering tip on and extending forwardly from said forward end, wire solder feeding mechanism comprising a wire solder feeding tube having a forward end adjacent to said soldering tip and an open rear end, a ratchet wheel journalled on said support and having teeth to engage wire solder within the feeding tube, a ratchet bar having teeth engaged with the teeth of the ratchet wheel, and means for actuating the ratchet bar for feeding wire solder forwardly in the feeding tube to the soldering tip, said feeding tube having opening means through which the ratchet wheel engages the solder, an electrical switch assembly mounted on said support and electrically connected to the soldering tip, said actuating means comprising a trigger member mounted for endwise movements on the support, and lost motion means connecting the trigger member to the ratchet bar, and spring means yieldably urging said trigger member toward its starting position and toward said ratchet bar for moving the ratchet bar to a starting position from an operated position, said lost motion means comprising said trigger member and a slide plate mounted on said support, said ratchet bar being pivoted on said slide plate and spring-pressed toward the ratchet wheel, said slide plate having an elongated notch and said trigger member having a lug engaged in said notch, said lug being shorter than the notch, and adjustable stop means on the support with which the slide plate is engageable as it is moved toward an operated position for limiting such movement for predetermining the length of the stroke of the ratchet bar for determining the length of wire solder fed along the feeding tube on a stroke of the ratchet bar.

4. A solder feeding soldering gun comprising a support having forward and rear ends, a soldering tip on and extending forwardly from said forward end, wire solder feeding mechanism comprising a wire solder feeding tube having a forward end adjacent to said soldering tip and an open rear end, a ratchet wheel journalled on said support and having teeth to engage wire solder within the feeding tube, a ratchet bar having teeth engaged with the teeth of the ratchet wheel, and means for actuating the ratchet bar for feeding wire solder forwardly in the feeding tube to the soldering tip, said feeding tube having opening means through which the ratchet wheel engages the solder, an electrical switch assembly mounted on said support and electrically connected to the soldering tip, said actuating means comprising a trigger member mounted for endwise movements on the support, and lost motion means connecting the trigger member to the ratchet bar, and spring means yieldably urging said trigger member toward its starting position and toward said ratchet bar for moving the ratchet bar to a starting position from an operated position, said lost motion means comprising said trigger member and a slide plate mounted on said support, said ratchet bar being pivoted on said slide plate and spring-pressed toward the ratchet wheel, said slide plate having an elongated notch and said trigger member having a lug engaged in said notch, said lug being shorter than the notch, and adjustable stop means on the support with which the slide plate is engageable as it is moved toward an operated position for limiting such movement for predetermining the length of the stroke of the ratchet bar for determining the length of wire solder fed along the feeding tube on a stroke of the ratchet bar, said stop means comprising a rotary member journalled on the support and having an eccentric pin to be engaged by a part of the slide plate.

5. A solder feeding soldering gun comprising a support having forward and rear ends, a soldering tip on and extending forwardly from said forward end, wire solder feeding mechanism comprising a wire solder feeding tube having a forward end adjacent to said soldering tip and an open rear end, an electrical switch assembly mounted on said support and electrically connected to the soldering tip, actuating means comprising a trigger member movably mounted on the support and operatively connected to the wheel means, said trigger member being operatively connected to the switch assembly for energizing the soldering tip only when the trigger member is moved from a starting position to an operative position, said switch assembly comprising a dielectric block having a longitudinal slot therethrough, contacts on said block exposed in said slot, said trigger member having an elongated contactor thereon engaged in said slot and slidable therein to bridge the contacts only in an operated position of the trigger member.

6. A solder feeding soldering gun comprising a support having forward and rear ends, a soldering tip on and extending forwardly from said forward end, wire solder feeding mechanism comprising a wire solder feeding tube having a forward end adjacent to said soldering tip and an open rear end, wheel means engageable with the solder for moving the solder to the soldering tip, an electrical switch assembly mounted on said support and electrically connected to the soldering tip, actuating means comprising a trigger member movably mounted on the support and operatively connected to the wheel means, said trigger member being operatively connected to the switch assembly for energizing the soldering tip only when the trigger member is moved from a starting position to an operative position, said switch assembly comprising a dielectric block having a longitudinal slot therethrough, contacts on said block exposed in said slot, said trigger member having an elongated contactor thereon engaged in said slot and slidable therein to bridge the contacts only in an operated position of the trigger member, said lost motion means providing for energization of the soldering tip in advance of operation of the wheel means for feeding wire solder through the feeding tube to the soldering tip, and a tip-illumining electric bulb mounted on the support adjacent to the soldering tip, said bulb being electrically connected to said switch assembly to be energized before and while the soldering tip is energized.

References Cited in the file of this patent

UNITED STATES PATENTS

| | | |
|---|---|---|
| 2,251,557 | Weston | Aug. 5, 1941 |
| 2,751,485 | Sauer | June 19, 1956 |
| 2,765,390 | Chapel et al. | Oct. 2, 1956 |
| 2,808,498 | Hudson et al. | Oct. 1, 1957 |
| 2,871,333 | Savage | Jan. 27, 1959 |
| 2,875,719 | Smith | Mar. 3, 1959 |
| 3,031,562 | Hongo | Apr. 24, 1962 |

FOREIGN PATENTS

| | | |
|---|---|---|
| 481,669 | Great Britain | Mar. 15, 1938 |
| 507,997 | Great Britain | June 22, 1939 |